US010017149B2

(12) United States Patent
Rea et al.

(10) Patent No.: US 10,017,149 B2
(45) Date of Patent: Jul. 10, 2018

(54) IGNITER ASSEMBLY WITH RETRACTABLE PISTON

(71) Applicant: Key Safety Systems, Inc., Sterling Heights, MI (US)

(72) Inventors: Sergio Rea, Colleferro (IT); Kathleen Meeker, St. Petersburg, FL (US)

( * ) Notice: Subject to any disclaimer, the term of this patent is extended or adjusted under 35 U.S.C. 154(b) by 0 days.

(21) Appl. No.: 15/324,999

(22) PCT Filed: Jul. 2, 2015

(86) PCT No.: PCT/US2015/038938
§ 371 (c)(1),
(2) Date: Jan. 9, 2017

(87) PCT Pub. No.: WO2016/007364
PCT Pub. Date: Jan. 14, 2016

(65) Prior Publication Data
US 2017/0210334 A1    Jul. 27, 2017

Related U.S. Application Data

(60) Provisional application No. 62/022,897, filed on Jul. 10, 2014.

(51) Int. Cl.
| | |
|---|---|
| B60R 21/36 | (2011.01) |
| B60R 21/274 | (2011.01) |
| B60R 21/261 | (2011.01) |
| B60R 21/272 | (2006.01) |
| B60R 21/26 | (2011.01) |

(52) U.S. Cl.
CPC .......... *B60R 21/274* (2013.01); *B60R 21/261* (2013.01); *B60R 21/272* (2013.01); *B60R 2021/2612* (2013.01); *B60R 2021/26029* (2013.01)

(58) Field of Classification Search
CPC .................... B60R 21/272; B60R 2021/26029
USPC .................................................. 280/736, 737
See application file for complete search history.

(56) References Cited

U.S. PATENT DOCUMENTS

| | | | |
|---|---|---|---|
| 5,076,607 A | 12/1991 | Woods et al. | |
| 5,131,680 A * | 7/1992 | Coultas | B60R 21/272 222/3 |
| 5,242,194 A * | 9/1993 | Popek | B60R 21/272 137/68.13 |

(Continued)

FOREIGN PATENT DOCUMENTS

| | | |
|---|---|---|
| DE | 102006060689 A1 | 6/2008 |
| EP | 0512747 A1 | 11/1992 |

(Continued)

*Primary Examiner* — Toan C To
(74) *Attorney, Agent, or Firm* — Markell Seitzman

(57) ABSTRACT

The present invention inflator (10) has an inflator housing (12), a diffuser (30), a frangible closure (40) and an igniter assembly (20). The igniter assembly (20) has an igniter housing (22), a squib (60) electrically actuated and fitted in an end of the igniter housing (22) and a retractable piston (50) affixed to the igniter housing (22). Upon actuation of the squib (60), the retractable piston (50) propels forward breaking the frangible closure (40) releasing gases pushing the piston (50) retractably back into or over the igniter housing (22) as the pressurized gas releases out of the diffuser (30).

27 Claims, 5 Drawing Sheets

(56) References Cited

U.S. PATENT DOCUMENTS

| | | | | |
|---|---|---|---|---|
| 5,257,819 A * | 11/1993 | Frantom | ............... | B60R 21/272 137/68.13 |
| 5,345,876 A * | 9/1994 | Rose | .................... | B60R 21/272 102/531 |
| 5,351,988 A * | 10/1994 | Bishop | .................. | B60R 21/272 222/5 |
| 5,351,989 A * | 10/1994 | Popek | .................. | B60R 21/272 222/5 |
| 5,462,307 A | 10/1995 | Webber et al. | | |
| 5,542,702 A * | 8/1996 | Green | .................... | B60R 21/268 222/3 |
| 5,584,505 A * | 12/1996 | O'Loughlin | .......... | B60R 21/272 222/5 |
| 5,590,906 A * | 1/1997 | Faigle | .................. | B60R 21/264 222/3 |
| 6,189,922 B1 * | 2/2001 | Parks | .................... | B60R 21/272 280/735 |
| 6,244,622 B1 * | 6/2001 | Al-Amin | ............... | B60R 21/268 137/68.13 |
| 2007/0138776 A1 * | 6/2007 | Rossbach | ............. | B60R 21/268 280/737 |

FOREIGN PATENT DOCUMENTS

| | | |
|---|---|---|
| EP | 1262380 A2 | 12/2002 |
| WO | 2011148351 A1 | 12/2011 |

* cited by examiner

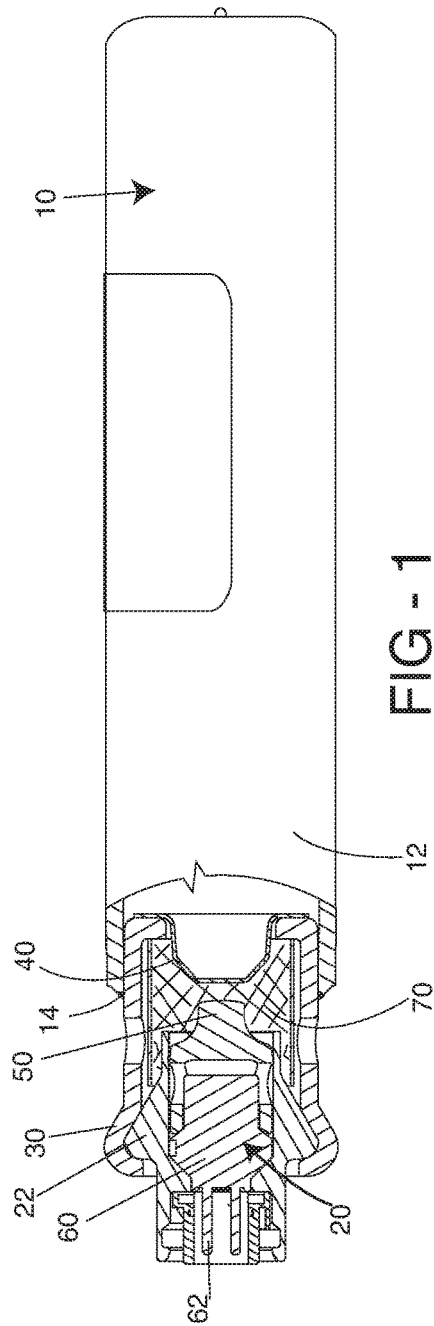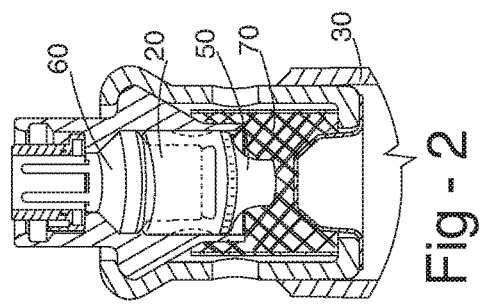

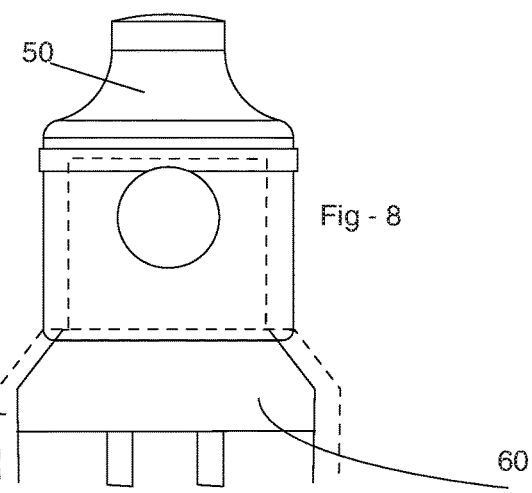
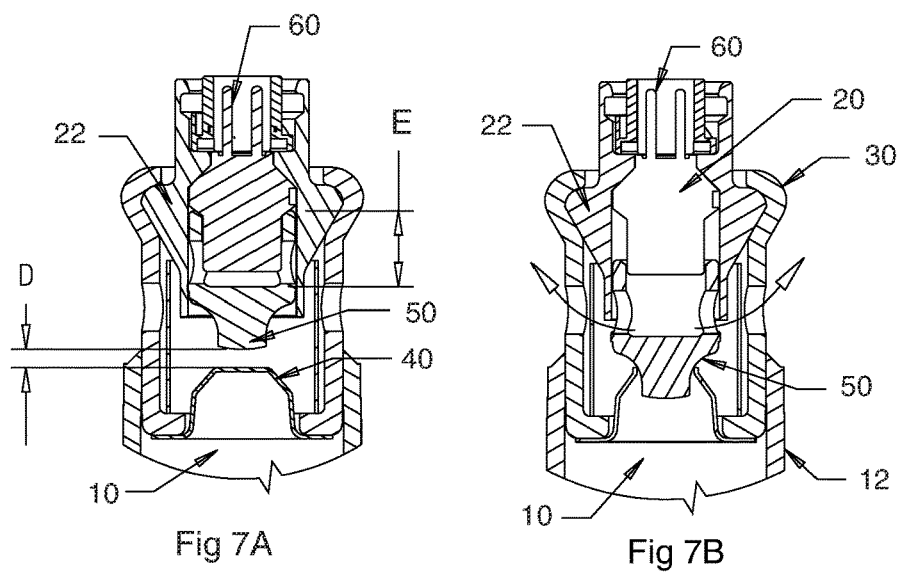
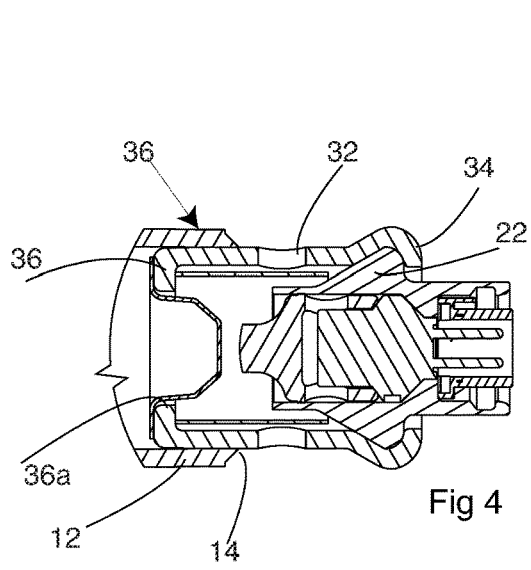
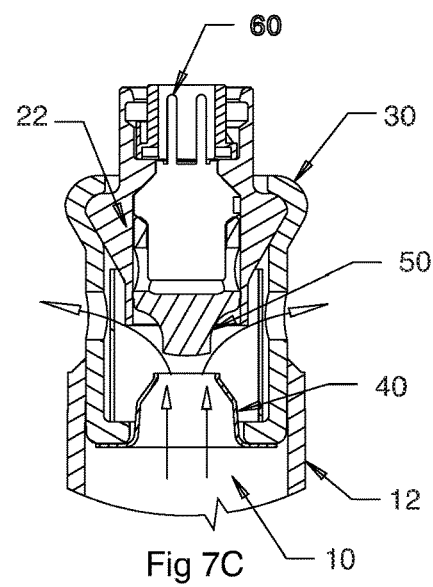

IGNITER ASSEMBLY WITH RETRACTABLE PISTON

FIELD OF THE INVENTION

This invention relates to an igniter assembly with a mechanical piston to open a sealed pressurized inflator for an airbag assembly.

BACKGROUND OF THE INVENTION

Hybrid or pressurized inflation devices, commonly referred to as inflators, have been used to inflate airbags for years. These devices can be combined with gas generant to form a hybrid inflator that releases pressurized gas and simultaneously burns propellant to generate additional inflation gas.

Alternatively, no propellant or generant can be used in the inflation device and only the pressurized gas stored will be used.

In both these style inflators, an igniter or squib receives an electrical signal from a crash sensor and the igniter fires to rupture a seal to release the gas and optionally to ignite generant in the hybrid inflators.

To improve reliability, mechanical devices can be used to break a seal as taught in U.S. Pat. No. 5,076,607; U.S. Pat. No. 5,462,307 and U.S. Pat. No. 5,584,505; all using a mechanical piston. These pistons will reliably break a seal during impact, but can cause an erratic release of gases when the piston is moved into an opening blocking arrangement with the diffuser passages. This can cause an obstruction in one or more openings which can result in a problem with uniform gas flow and create thrust effects not anticipated in a normally thrust neutral diffuser. To avoid this, the diffuser has been positioned on a side or even at a far end. However, this makes the inflator bulky or longer than otherwise needed.

The present invention overcomes these short comings in a simpler and more efficient manner, that not only avoids any chance of an obstruction of flow openings, it also allows the inflator to use higher pressures and less expensive gases.

SUMMARY OF THE INVENTION

The present invention has an inflator housing, a diffuser, a frangible closure and an igniter assembly.

The inflator housing stores inflation gases under pressure. The frangible closure seals the pressurized inflation gas inside the inflator housing. The diffuser has a plurality of holes for directing gas flow.

The igniter assembly has an igniter housing, a squib electrically actuated and fitted in an end of the igniter housing and a retractable piston affixed to the igniter housing. Upon actuation of the squib, the retractable piston propels impacting and breaking the frangible closure releasing gases pushing the piston retractably back into or over the igniter housing as the pressurized gas releases out of the diffuser.

The igniter assembly has the igniter housing configured to accept the squib at one first end. The squib has electrical connectors extending to attach to wiring connections for actuating the squib. The assembly is affixed to an end of the diffuser and has the retractable piston attached to the igniter housing at a second end opposite the first end and aligned with the frangible closure. The igniter housing has an open passage or chamber between the squib and the retractable piston. The retractable piston is adapted to fit into the chamber internally or over the chamber externally closing the chamber at said second end.

The retractable piston has a striker or impact portion of a decreasing diameter. The impact portion extends from the base at the igniter housing to an impact end or tip. The impact portion has a length of at least a few millimeters. On assembly, the impact end is fixed a distance (d) from a rupture portion of the frangible closure. The retractable piston has a hollow venting sleeve portion sized to fit over the igniter housing or, preferably, to fit inside the chamber of the igniter housing. The sleeve portion and the igniter housing can be formed as cylindrical tubes sized to fit together on assembly. The sleeve portion extends from the base of the piston and has a length (e) greater than the distance (d) between the impact end and the rupture portion of the frangible closure. This allows the piston to be propelled by the firing of the squib to rupture or break the frangible closure on impact and to travel a distance less than (e) while being stopped by the ruptured closure or inflator housing. This control of impact and distance of travel keeps the sleeve at least partially over or in the igniter housing. The sleeve has one or more, preferably two, vent holes to release the gas pressure generated by the squib. As that gas is vented outwardly, the pressurized inflator gas pushes the piston back over or into the igniter housing to a retracted position.

The retractable piston is guided by the igniter housing and remains centered in the inflator at the diffuser location. This prevents the retractable piston from dislodging and being an obstruction to any gas flow opening.

In a preferred embodiment, the retractable piston may include peripheral slots at or near the base, these slots provide a means to hold the piston and igniter housing locally in a press fit to allow a more predictable separation when the squib is activated.

BRIEF DESCRIPTION OF THE DRAWINGS

The invention will be described by way of example and with reference to the accompanying drawings in which:

FIG. 1 is a plan view of the inflator of the present invention showing in cross section the portions of the igniter assembly, the diffuser and frangible closure.

FIG. 2 is a cross-sectional view of the diffuser and igniter assembly of the present invention.

FIG. 4 is a cross-sectional view of the diffuser.

FIGS. 7A-7C show how the piston moves on actuation without dislodging from the igniter housing.

FIG. 8 is an alternative embodiment wherein the retractable piston fits over the igniter housing.

DETAILED DESCRIPTION OF THE INVENTION

Figure 3:
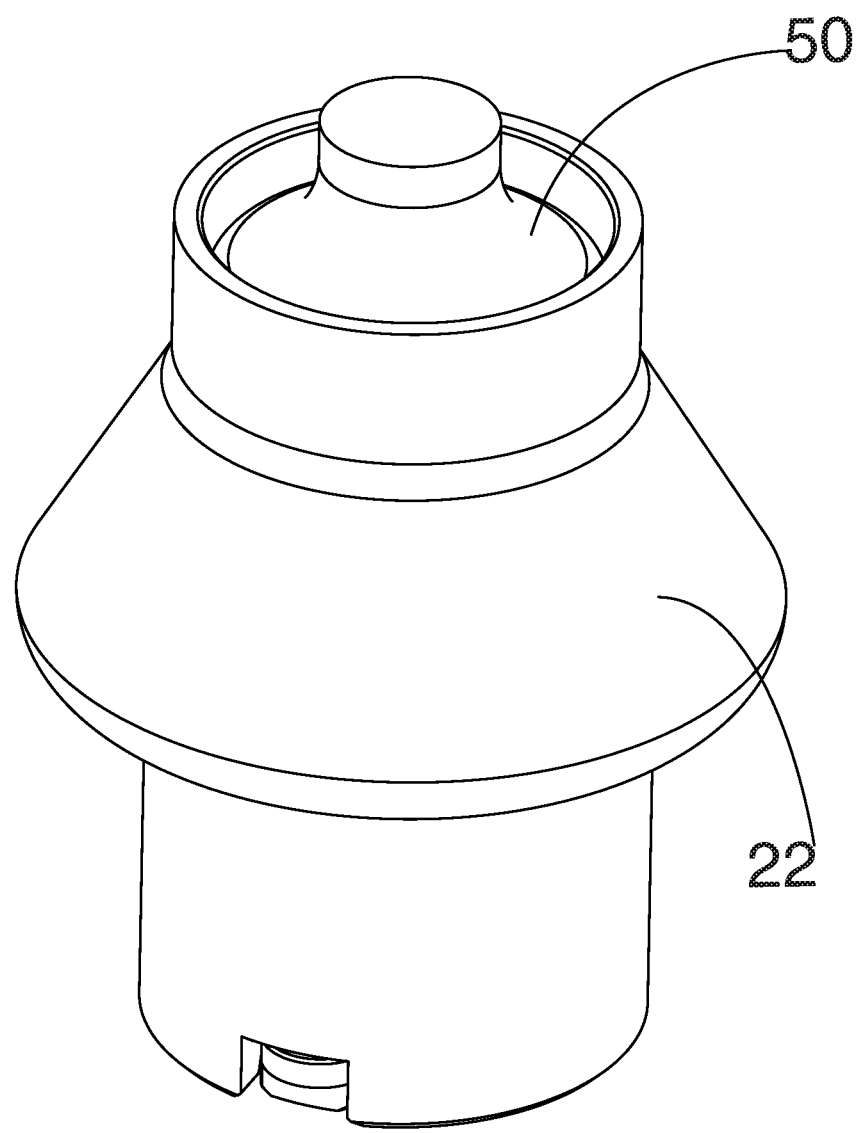
FIG. 3 is a perspective view of the diffuser and igniter assembly of the present invention.

With reference to FIG. 1, an inflator is illustrated. The inflator 10 is shown having a pressure vessel 12 into which a pressurized gas is contained and held in the pressure vessel 12 sealed by a frangible closure 40. As shown, the frangible closure 40 separates the inflation gases from a diffuser 30 and an igniter assembly 20. The igniter assembly 20, as illustrated, has a squib 60 with electrical connectors 62 that can be attached to wiring connectors to receive an electric signal to activate the squib 60. The igniter assembly 20 further has an igniter housing 22; placed inside the igniter housing 22 is a retractable piston 50, as illustrated.

The entire assembly is firmly fixed in the diffuser 30 as further shown in FIG. 2. In FIG. 2 a partial cross-sectional view is taken wherein the igniter housing 22 has been cut away exposing the retractable piston 50 and a portion of the squib 60. Externally surrounding the igniter assembly 20 in FIG. 2 is shown a wire mesh filter screen 70. This filter screen 70 will trap any propellant or debris that projects from the diffuser 30.

FIG. 3 is a perspective view of the igniter assembly 20 fully assembled showing the igniter housing 22 with the retractable piston 50 inserted inside a chamber and fixed thereto in such a fashion that the entire assembly makes one compact device for rupturing the frangible closure 40.

With reference to FIG. 4, the diffuser 30 is shown having a plurality of openings 32 which allow for gases to be vented to fill an airbag, for example. The diffuser 30 has a large end 34 pressure vessel 12 that is rolled about an adjacent end of the igniter housing 22. At an opposite small end 36 of the diffuser 30 is an opening 36a. End 26 is inserted into an open end of the pressure vessel 12. This construction securely mounts the diffuser 30 to the pressure vessel 12; the diffuser 30 can be welded or otherwise secured to the pressure vessel 12 at the location shown at location 14.

Figure 5:
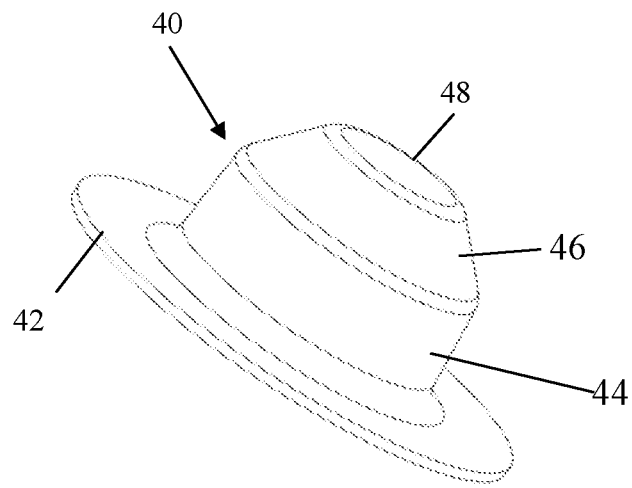
FIG. 5 is a perspective view of the frangible closure.

With reference to FIG. 5, the frangible closure 40 is shown in a perspective view having a flange 42 which fits over the diffuser as illustrated in FIGS. 1 and 2. This flange 42 seals against the diffuser 30 and prevents gases from being released from the housing prematurely. As shown, the frangible closure 40 extends inwardly into the diffuser 30 having a cylindrical portion 44 extending into the diffuser 30 with a conical portion 46 extending to a rupture portion 48, the rupture portion 48 being of a diameter sufficiently small that it enables the frangible closure 40 to be easily broken on impact by the retractable piston 50 upon actuation of the squib 60. As illustrated, the frangible closure 40 provides a unique mechanical structure that is able to absorb the impact load of the retractable piston 50 in such a way that the rupture portion 48 breaks cleanly upon impact, but prevents the piston 50 from moving any further due to the structural integrity of the remaining portion of the frangible closure 40.

Figure 6A:
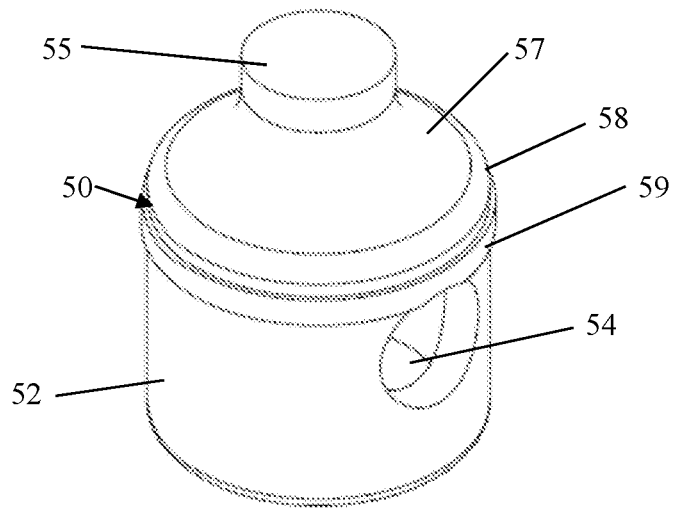
FIG. 6A is a perspective view of the top of the retractable piston.
Figure 6B:
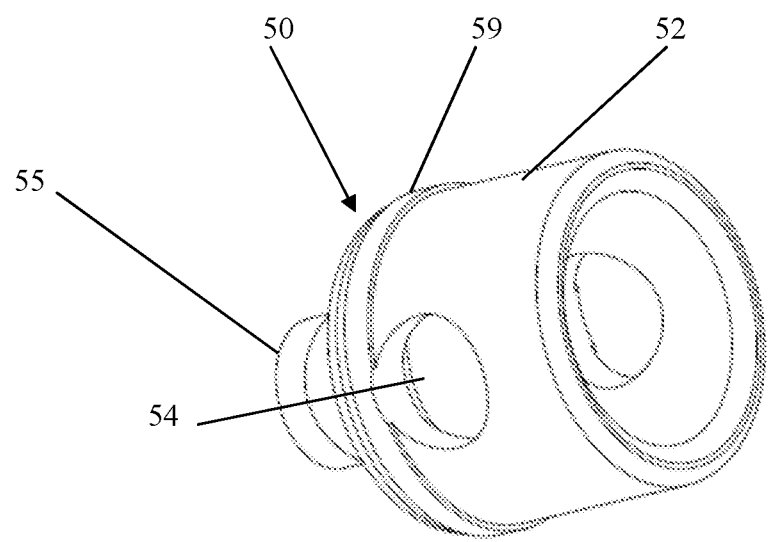
FIG. 6B is a perspective view of the retractable piston looking in the open end of the sleeve portion.
Figure 6C:
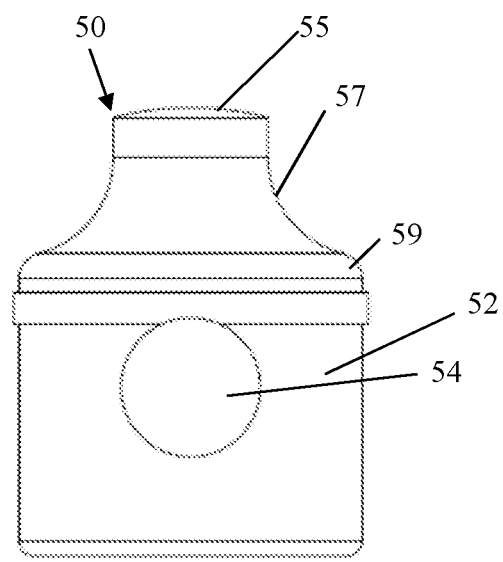
FIG. 6C is a plan view of the retractable piston.

With reference to FIGS. 6A, 6B and 6C, the retractable piston 50 is shown. The retractable piston 50 has a cylindrical sleeve 52. The cylindrical sleeve 52 has a plurality of openings 54 which allow gases generated by the squib on actuation to vent out from inside the sleeve 52 thereby reducing internal pressure and allowing the retractable piston 50 to be $|_{[KM1]}$moved by the pressurized gas leaving the pressure vessel 12 when the rupture occurs at the frangible closure 40. The impact end 55 of the retractable piston 50 is sized of a diameter to correspond with the rupture portion 48 of the frangible closure 40. As shown, the diameter is slightly smaller than the rupture portion 48, therefore on impact, the retractable piston 50 can enter into the frangible closure 40 a short distance. As shown, the impact end 55 is somewhat cylindrical then flares out to an increasing diameter to the base portion 58 of the retractable piston 50. Around the outer periphery of the base portion 58 is a projecting ring 59. This projecting ring 59 as shown fits tightly into the igniter housing 22 in a press fit relationship such that when the squib 60 is activated, this portion of the device holding the piston 50 and igniter housing 22 together are overcome by the pressure allowing the retractable piston 50 to propel forward to break the frangible closure 40. As shown, when the closure 40 is broken the piston 50 limits the amount of travel due to the increasing diameter along the curved or conical section 57 between the base 58 and the end 55. This stops the device from extending any further than a fixed distance. Once this distance is achieved, the piston 50 stops. As the retractable piston 50 is moving forward the openings 54 are exposed as the piston 50 moves relative to the igniter housing 22. As the openings 54 are exposed, internal gases are released, and as previously described, allows the piston 50 to be retracted due to the oncoming inrush of gases from the pressure vessel 12 into the diffuser 30. Since the retractable piston 50 never leaves contact with the internal surface of the igniter housing 22, it is perfectly centered and upon the release of stored $gas|_{[KM2]}$ will move back into its original or close to its original position inside the igniter housing 22. This ensures that the retractable piston 50 cannot become dislodged or move into a position to block any of the openings 32 of the diffuser 30. This uniquely allows the diffuser 30 to operate with high reliability of performance without causing any unusual obstructions on the gas flow emitted from the hybrid or gas filled inflator.

FIGS. 7A, 7B and 7C show a view of the igniter assembly 20 with the piston 50 as described above fitted into the igniter housing 22 and show the distance (d) between the frangible closure 60 and the impact end 55. In step one, FIG. 7A, pre-ignition of the squib 60, the inflator 10 is shown in its fully loaded position. Upon actuation of the squib 60 the propellant in the squib 60 pushes the retractable piston 50 forward, see FIG. 7B, breaking the rupture portion 48 of the frangible closure 40. Gases generated by the squib propellant are ejected through the openings 54 in the sleeve 52 of the retractable piston 50 as the impact end 55 of the piston 50 penetrates through the frangible closure 40. As the gases expel from inside the igniter housing 22, and retractable piston 50 experiences a drop in pressure inside the pressure vessel 12, the inflation gases push the retractable piston 50 back, see FIG. 7C, into the igniter housing 22 back into a fully or almost fully retracted position; at this point the inflation gases are also being displaced and released through vent openings 32 of the diffuser 30 to inflate an airbag (not shown). As illustrated, the retractable piston 50 never leaves contact with the igniter housing 22 and as such it is completely centered throughout the actuation process. This ensures that the entire igniter assembly 20 can perform its function of penetrating and breaking the rupture portion 48 of the frangible closure 40 caused by the impact of the retractable piston 50 which is then pushed back into the housing concentrically in such a fashion that it cannot block any of the diffuser openings 32 or impede any of the gas flow as shown.

With reference to FIG. 8, an alternative embodiment of the present invention is shown where the retractable piston 50 is mounted over the external surface of an igniter housing 22 in such a fashion that the igniter housing 22 acts as a cylinder post or guide for the retractable piston 50 to sit over. The function is basically the same as that of the other igniter housing 22, as it also prevents the retractable piston 50 from dislodging from the igniter housing 22 and therefore prevents any potential obstruction of the diffuser gas vent openings 32.

With further reference to FIG. 7, it is important to notice the gap between the impact end 55 of the retractable piston 50 and the frangible closure 40 is set a distance (d). The sleeve 52 has a length extending a distance (e). The distance (e) is substantially longer than the distance (d), therefore, on penetration of the rupture portion 48, the surface 57 of increasing diameter between the base 58 and the impact end 55 of the retractable piston 50 pushes against the closure 40 as previously described. This prevents further movement and limits that movement such that it is always less than the dimension (e). In these circumstances, the pressure applied from the inside of the inflator 10 pushes against the piston 50 forcing it back into or over the igniter housing 22 as previously discussed.

As shown, it is important to note the closure 40 shape and the piston impact end 55 have been designed in such a way that the closure 40 is not just a semi-sphere or a dome, but it contains a flat area in the top to be impacted by the piston end 55 and a conical area 57 immediately after. This flat area must be in the path of the end 55 impacting the flat area in the closure 40 to rupture in and bend a circular corner where the material is weaker due to the stamping stress, so to detach systematically as a regular disk. Then the piston penetrates inside the closure 40, through the radius between end 55, and piston body 50 is able to deform the cone in the opposite side stressing the second circular corner up to the detachment of a crown, which often remains trapped in the piston end 55. In conclusion, the piston 50 normally detaches from the closure 40 the central disk and a crown which can be a full crown or fractured crown. The idea is to generate a standard behavior in the opening mechanism, reducing the fragmentation of the closure 40 to avoid projection of metal particles.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An igniter assembly (20) for releasing gas flow when assembled to an inflator (10), the igniter assembly (20) comprising:
an igniter housing (22), a squib (60) electrically actuated and fitted in an end of the igniter housing (22) and a retractable piston (50) affixed to the igniter housing (22) wherein the igniter housing (22) extends inwardly forming a chamber to hold a portion of the squib (60) and the retractable piston (50) is held in the chamber of the igniter housing (22) at an end opposite the squib (60), the retractable piston (50) having a sleeve (52) portion sized to fit inside the chamber portion, the sleeve (52) portion having one or more vent holes (54); and
wherein upon actuation of the squib (60) the retractable piston (50) propels impacting breaking a frangible closure (40) releasing gases pushing the piston (50) retractably back into or over the igniter housing (22).

2. The igniter assembly (20) of claim 1 wherein the igniter assembly (20) has the squib (60) in the igniter end extending through an opening for access to electrical connectors of the squib (60).

3. The igniter assembly (20) of claim 1 wherein the retractable piston (50) has an impact end (55) spaced a distance (d) from a rupture portion (48) of the frangible closure (40), and the sleeve (52) has a length (e) exceeding the distance the retractable piston (50) moves to break the rupture portion (48) on activation of the squib (60).

4. The igniter assembly (20) of claim 3 wherein the retractable piston (50) has a base portion (58) positioned between the sleeve (52) and the impact end (55).

5. The igniter assembly (20) of claim 4 wherein the impact end (55) has a diameter smaller than the rupture portion (48) of the frangible closure (40).

6. The igniter assembly (20) of claim 5 wherein the diameter from the impact end (55) to the base (58) of the retractable piston (50) is constantly increasing in diameter to the base (58).

7. The igniter assembly (20) of claim 6 wherein the sleeve (52) has a projecting ring (59) adjacent the base (58) to press fit into the chamber of the igniter housing (22).

8. An igniter assembly (20) for releasing gas flow when assembled to an inflator (10), the igniter assembly (20) comprising:
an igniter housing (22), a squib (60) electrically actuated and fitted onto an end of the igniter housing (22) and a retractable piston (50) affixed to the igniter housing (22) wherein the igniter housing (22) extends inwardly forming a chamber to hold a portion of the squib (60) and the retractable piston (50) is held in the chamber of the igniter housing (22) at an end opposite the squib (60) wherein the retractable piston (50) has a sleeve portion sized to fit over the igniter housing (22) at an end opposite the squib (60), the sleeve (52) portion having one or more vent holes (54); and
wherein upon actuation of the squib (60) the retractable piston (50) propels impacting breaking a frangible closure (40) releasing gases pushing the piston (50) retractably back onto or over the igniter housing (22).

9. The igniter assembly (20) of claim 8 wherein the igniter assembly (20) has the squib (60) in the igniter end extending through an opening for access to electrical connectors of the squib (60).

10. The igniter assembly (20) of claim 8 wherein the retractable piston (50) has an impact end (55) spaced a distance (d) from a rupture portion (48) of the frangible closure (40), and the sleeve (52) has a length (e) exceeding the distance the retractable piston (50) moves to break the rupture portion (48) on activation of the squib (60).

11. The igniter assembly (20) of claim 10 wherein the retractable piston (50) has a base portion (58) positioned between the sleeve (52) and the impact end (55).

12. The igniter assembly (20) of claim 11 wherein the impact end (55) has a diameter smaller than the rupture portion (48) of the frangible closure (40).

13. The igniter assembly (20) of claim 12 wherein the diameter from the impact end (55) to the base (58) of the retractable piston (50) is constantly increasing in diameter to the base (58).

14. An inflator (10) comprising:
an inflator housing (12) for storing inflation gases under pressure;
a frangible closure (40) sealing the inflation gas inside the inflator housing (12);
a diffuser (30) attached to an end of the inflator housing (12), the diffuser (30) having a plurality of holes (32) for directing gas flow;
an igniter assembly (20) for releasing gas flow, the igniter assembly (20) having an igniter housing (22), a squib (60) electrically actuated and fitted in an end of the igniter housing (22) and a retractable piston (50) affixed to the igniter housing (22) wherein the igniter housing (22) extends inwardly relative to the diffuser (30)

forming a chamber to hold a portion of the squib (60), the retractable piston (50) is held in the chamber of the igniter housing (22) at an end opposite the squib (60) and the retractable piston (50) having a sleeve (52) portion sized to fit inside the chamber portion, the sleeve (52) portion having one or more vent holes (54); and wherein upon actuation of the squib (60) the retractable piston (50) propels impacting breaking the frangible closure (40) releasing gases pushing the piston (50) retractably back into or over the igniter housing (22).

15. The inflator (10) of claim 14 wherein the diffuser (30) has the igniter assembly (20) held in place with the squib (60) and the igniter end extending through an opening in the diffuser (30) for access to electrical connectors of the squib (60).

16. The inflator (10) of claim 14 wherein the frangible closure (40) is affixed to an end of the diffuser (30).

17. The inflator (10) of claim 16 wherein the diffuser (30) is affixed to the inflator housing (12).

18. The inflator (10) of claim 14 wherein the retractable piston (50) has an impact end (55) spaced a distance (d) from a rupture portion (48) of the frangible closure (40), and the sleeve (52) has a length (e) exceeding the distance the retractable piston (50) moves to break the rupture portion (48) on activation of the squib (60).

19. The inflator (10) of claim 15 wherein the retractable piston (50) has a base portion positioned between the sleeve (52) and the impact end (55).

20. The inflator (10) of claim 19 wherein the impact end (55) has a diameter smaller than the rupture portion (48) of the frangible closure (40).

21. The inflator (10) of claim 20 wherein the diameter from the impact end (55) to the base (58) of the retractable piston (50) is constantly increasing in diameter to the base (58).

22. The inflator (10) of claim 21 wherein the sleeve (52) has a projecting ring (59) adjacent the base (58) to press fit into the chamber of the igniter housing (22).

23. An inflator (10) comprising:
an inflator housing (12) for storing inflation gases under pressure;
a frangible closure (40) sealing the inflation gas inside the inflator housing (12);
a diffuser (30) attached to an end of the inflator housing (12), the diffuser (30) having a plurality of holes (32) for directing gas flow;
an igniter assembly (20) for releasing gas flow, the igniter assembly (20) having an igniter housing (22), a squib (60) electrically actuated and fitted onto an end of the igniter housing (22) and a retractable piston (50) affixed to the igniter housing (22) wherein the igniter housing (22) extends inwardly relative to the diffuser (30) forming a chamber to hold a portion of the squib (60), the retractable piston (50) is held in the chamber of the igniter housing (22) at an end opposite the squib (60) wherein the retractable piston (50) has a sleeve portion sized to fit over the igniter housing (22) at an end opposite the squib (60), the sleeve (52) portion having one or more vent holes (54); and wherein upon actuation of the squib (60) the retractable piston (50) propels impacting breaking the frangible closure (40) releasing gases pushing the piston (50) retractably back into or over the igniter housing (22).

24. The inflator (10) of claim 23 wherein the diffuser (30) has the igniter assembly (20) held in place with the squib (60) and the igniter end extending through an opening in the diffuser (30) for access to electrical connectors of the squib (60).

25. The inflator (10) of claim 23 wherein the frangible closure (40) is affixed to an end of the diffuser (30).

26. The inflator (10) of claim 25 wherein the diffuser (30) is affixed to the inflator housing (12).

27. The inflator (10) of claim 23 wherein the retractable piston (50) has an impact end (55) spaced a distance (d) from a rupture portion (48) of the frangible closure (40), and the sleeve (52) has a length (e) exceeding the distance the retractable piston (50) moves to break the rupture portion (48) on activation of the squib (60).

* * * * *